United States Patent
Sanderson

(10) Patent No.: US 11,627,692 B2
(45) Date of Patent: Apr. 18, 2023

(54) QUICK-CHANGE SYSTEM FOR A SWEEP

(71) Applicant: NATT Tools Group Inc., Hamilton (CA)

(72) Inventor: Donald Joseph Sanderson, Hamilton (CA)

(73) Assignee: NATT Tools Group, Inc., Hamilton (CA)

( * ) Notice: Subject to any disclaimer, the term of this patent is extended or adjusted under 35 U.S.C. 154(b) by 962 days.

(21) Appl. No.: 16/015,385

(22) Filed: Jun. 22, 2018

(65) Prior Publication Data

US 2018/0368305 A1 Dec. 27, 2018

Related U.S. Application Data

(60) Provisional application No. 62/523,900, filed on Jun. 23, 2017.

(51) Int. Cl.
| | |
|---|---|
| *A01B 15/02* | (2006.01) |
| *A01B 15/06* | (2006.01) |
| *A01B 35/22* | (2006.01) |
| *F16B 21/16* | (2006.01) |
| *A01B 23/02* | (2006.01) |
| *F16B 2/14* | (2006.01) |

(52) U.S. Cl.
CPC .............. *A01B 15/02* (2013.01); *A01B 15/06* (2013.01); *A01B 35/225* (2013.01); *A01B 23/02* (2013.01); *F16B 2/14* (2013.01); *F16B 21/16* (2013.01)

(58) Field of Classification Search
CPC ....... A01B 35/225; A01B 15/02; A01B 15/06; A01B 23/02; F16B 21/16; F16B 2/14

USPC .................................................. 172/753, 762
See application file for complete search history.

(56) References Cited

U.S. PATENT DOCUMENTS

| | | | | |
|---|---|---|---|---|
| 1,345,209 A | * | 6/1920 | Martin ................. | A01B 35/225 403/386 |
| 1,443,050 A | * | 1/1923 | Smith et al. ......... | A01B 35/225 403/380 |
| 2,097,354 A | * | 10/1937 | Thompson ........... | A01B 35/225 403/188 |
| 2,712,280 A | * | 7/1955 | Peoples ................ | A01B 35/225 403/388 |
| 2,757,595 A | * | 8/1956 | Clifford et al. ...... | A01B 35/225 172/762 |
| 2,908,340 A | * | 10/1959 | Love et al. ........... | A01B 35/20 172/762 |
| 3,792,736 A | * | 2/1974 | Gondeiro ............. | A01B 15/025 172/751 |

(Continued)

*Primary Examiner* — Thomas B Will
*Assistant Examiner* — Joel F. Mitchell
(74) *Attorney, Agent, or Firm* — The Webb Law Firm

(57) ABSTRACT

Quick-change system for a sweep comprising a sweep with a neck and a removable wedge, wherein the neck serves to couple the sweep to a cultivator shank and comprises an inner surface with at least one lug that fits in at least one hole of the cultivator shank, and side flaps configured to clasp the cultivator shank, the removable wedge being inserted between the side flaps and the cultivator shank and holding the cultivator shank against the inner surface of the neck, so that the combination of the lug fitted in the hole of the cultivator shank and the removable wedge inserted in the neck makes it possible to retain and fasten the sweep to the cultivator shank.

17 Claims, 7 Drawing Sheets

(56) References Cited

U.S. PATENT DOCUMENTS

| | | | |
|---|---|---|---|
| 5,007,484 A * | 4/1991 | Johanson | A01B 23/02 |
| | | | 172/1 |
| 5,485,886 A * | 1/1996 | Bassett | A01B 35/26 |
| | | | 172/744 |
| 5,558,165 A * | 9/1996 | Bucher et al. | A01B 35/225 |
| | | | 172/721 |
| 5,711,378 A | 1/1998 | Yeager | |
| 5,941,318 A | 8/1999 | Bergen | |
| 5,964,130 A * | 10/1999 | Wang | B25B 7/02 |
| | | | 81/424 |
| 6,289,996 B1 | 9/2001 | Parish | |
| 6,315,057 B1 | 11/2001 | Borter | |
| 6,315,058 B1 | 11/2001 | Birkenbach et al. | |
| 6,571,884 B1 | 6/2003 | Horvath et al. | |
| 6,585,058 B2 | 7/2003 | Zaun et al. | |
| 6,684,963 B1 | 2/2004 | Poutre et al. | |
| 6,814,151 B1 | 11/2004 | Peck et al. | |
| 6,938,700 B2 | 9/2005 | Zaun et al. | |
| 6,957,476 B2 * | 10/2005 | Poutre" et al. | A01B 35/225 |
| | | | 29/267 |
| 7,070,007 B2 | 7/2006 | Poutre et al. | |
| 7,124,836 B2 | 10/2006 | Poutre et al. | |
| 7,240,741 B2 | 7/2007 | Zaun et al. | |
| 7,493,964 B2 | 2/2009 | Henry et al. | |
| 8,037,943 B2 | 10/2011 | Castellvi | |
| 8,037,944 B2 | 10/2011 | Castellvi | |

* cited by examiner

QUICK-CHANGE SYSTEM FOR A SWEEP

CROSS-REFERENCE TO RELATED APPLICATIONS

This application claims priority to U.S. Provisional Application No. 62/523,900, entitled "Quick-Change System for a Sweep", filed Jun. 23, 2017, the entire disclosure of which is hereby incorporated by reference.

DESCRIPTION

Object of the Invention

The object of the present invention relates to a quick-change system for a sweep, the configuration and design of which facilitates the assembly, reducing the time required for the installation of the sweep, also being a solution with a more robust and universal application than those currently existing.

It is especially applicable to the agricultural industry.

Background of the Invention

Nowadays, the cultivator shanks of agricultural machines have sweeps installed at the ends thereof that serve to work the soil. These sweeps suffer from wear and structural deformations during use due to friction and abrasion with the soil. Therefore, it is desirable for such worn sweeps to be exchanged for new ones in a quick and simple manner.

There are different quick-change system solutions in the market for sweeps. The following US documents are related to quick-change systems:

U.S. Pat. Nos. 8,037,944; 8,037,943; 7,493,964; 7,240,741; 7,124,836; 7,070,007; 6,938,700; 6,814,151; 6,684,963; 6,585,058; 6,571,884; 6,571,378; 6,315,058; 6,315,057; 6,289,996; 5,941,318; 5,711,378.

In all the documents, the quick-change systems described therein uses an adapter, which is previously installed in the cultivator shank and subsequently couples the sweep in said adapter.

Therefore, the drawback of said solutions lies in having to mount the adapters in the cultivator shanks (generally by screwing them), with the time involved in this operation and subsequently assembling the sweeps in said adapters.

In addition, the use of a particular type of adapter conditions the profile of the sweep to be used thereon, which implies the limitation of having to use certain sweeps suitable for the corresponding adapters thereof.

On the other hand, many of the sweeps of these systems have holes in their surface through which screws or other similar elements are inserted to secure the sweep to the adapter. These holes cause many of said sweeps to break, the origin of the break being the hole.

DESCRIPTION OF THE INVENTION

In a first aspect of the invention, the present invention relates to a quick-change system for a sweep. This quick-change system comprises a sweep, which in turn comprises a neck wherein the neck is configured to couple the sweep to a cultivator shank. The neck comprises an inner surface with at least one lug that fits in at least one hole of the cultivator shank, and side flaps configured to clasp said cultivator shank. In addition, the system comprises a removable wedge configured to be inserted between the side flaps and the cultivator shank and to hold the cultivator shank against the inner surface of the neck. In this way, the combination of the at least one lug fitted in a hole of the cultivator shank and the removable wedge arranged inserted in the neck makes it possible to retain and fasten the sweep to the cultivator shank.

The neck has a "C"-shaped profile, wherein the inner surface forms the central part of the "C". The side flaps are symmetrical, face each other inwardly and include bent portions.

The removable wedge is wedge-shaped and comprises in a central part a protrusion with a slit, wherein the protrusion is configured to protrude and be located between the side flaps.

The neck may have a straight longitudinal section or it may be curved, as can the removable wedge; this will depend on the design of the cultivator shank on which the sweep is to be installed.

Preferably, for greater fastening, the inner surface of the neck comprises two lugs which fit into respective holes of the cultivator shank. Regardless of whether there are one or two lugs, these can be cylindrical, oblong or a combination of both. This will depend on the holes of the cultivator shanks where the sweep is to be installed.

The removable wedge further comprises a mounting indicator defined between a top mark and a bottom mark, both the top and the bottom marks being comprised in the removable wedge, such that the removable wedge is correctly placed when an upper part of the neck is placed within the mounting indicator.

Another aspect of the invention is the tool for disassembling the sweep comprised in the quick-change system described in the present application of the cultivator shank, wherein the tool is configured to release the removable wedge from the sweep. Specifically, the tool fits over the slit of the protrusion of the removable wedge and levers against the sweep to release said removable wedge. The tool could also be part of the quick-change system of the present invention.

In order to do the above release, the tool comprises a "U" inverted shape, where in the intermediate part of the inverted "U", the tool comprises two opposite tabs, each tab being configured to fit over the slit of the removable wedge and to lever against the sweep. The tool further comprises a grip on one end of the tool and a striking area on the other end of the tool.

BRIEF DESCRIPTION OF THE DRAWINGS

To complete the description and for the purpose of facilitating a better understanding of the features of the invention, this specification is accompanied by a set of drawings, as an integral part thereof, where by way of non-limiting example, the following has been represented.

DETAILED DESCRIPTION

Figure 1:
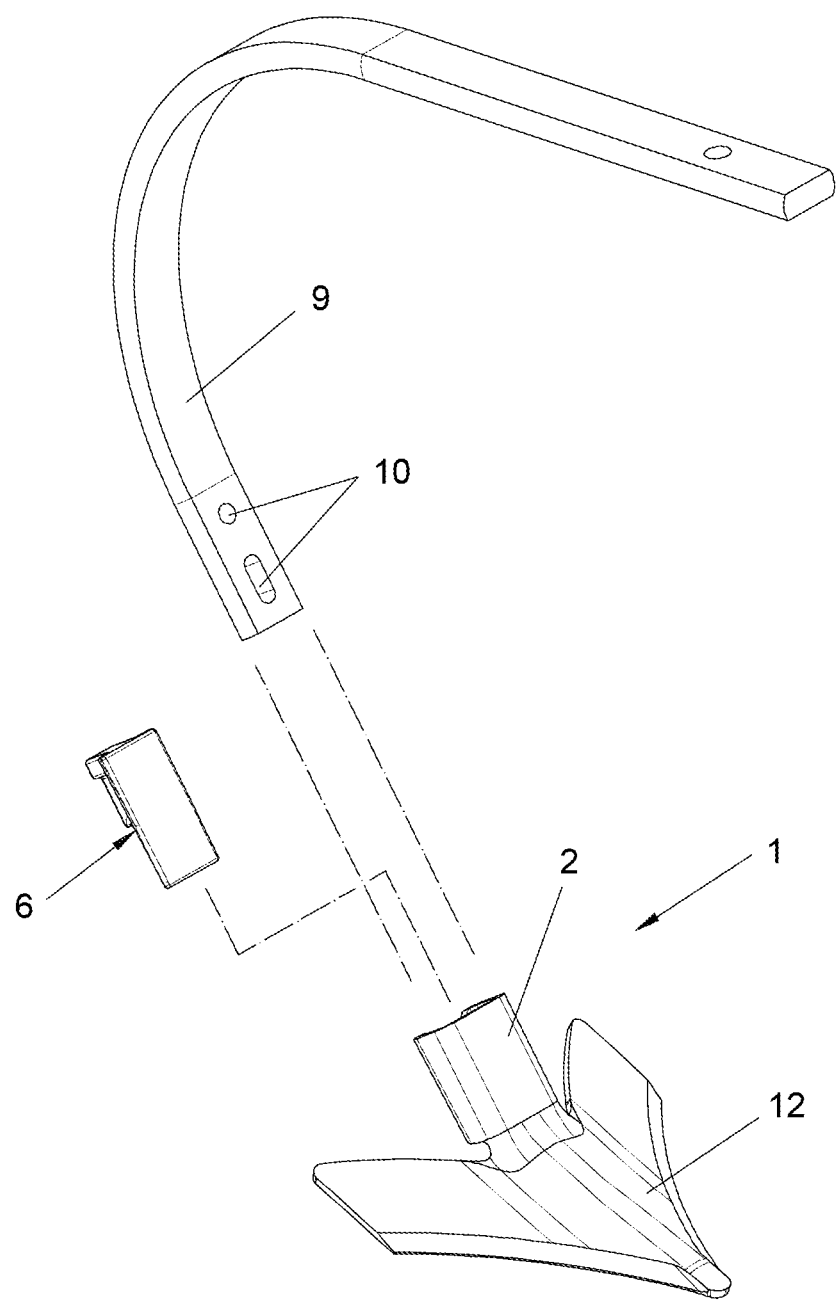
FIG. 1.—Shows a perspective view of the quick-change system for a sweep.

The quick-change system (1) for a sweep (12) object of the present invention makes it possible to couple sweeps (12) directly to the cultivator shanks (9) of agricultural machines. This novel quick-change system (1) enables the user to change the sweep (12) quickly through a simple manual action. Therefore, it is not necessary to use an intermediate adapter, which must be previously screwed to the cultivator shank (9) to which the sweep (12) is coupled as in the quick-change systems in the state of the art, such that the operating times of assembly and disassembly are shorter than in the systems currently used.

In addition, the solution of this quick-change system (1) is universal, given that it does not need intermediate adapters and that it may be adapted to all cultivator shanks (9) existing in the market. Costs are also reduced due to the simplicity of this quick-change system (1) with respect to current quick-change systems.

The quick-change system (1) of the present invention shown in FIG. 1 comprises a sweep (12), which in turn comprises a neck (2), said neck (2) being configured to couple the sweep (12) to a cultivator shank (9); and a wedge-shaped removable wedge (6) that enables the sweep (12) to be fastened against the cultivator shank (9). The wedge shape of the removable wedge (6) is similar to a triangular prism and enables said piece (6) to be easily inserted into the neck (2).

Figure 2:
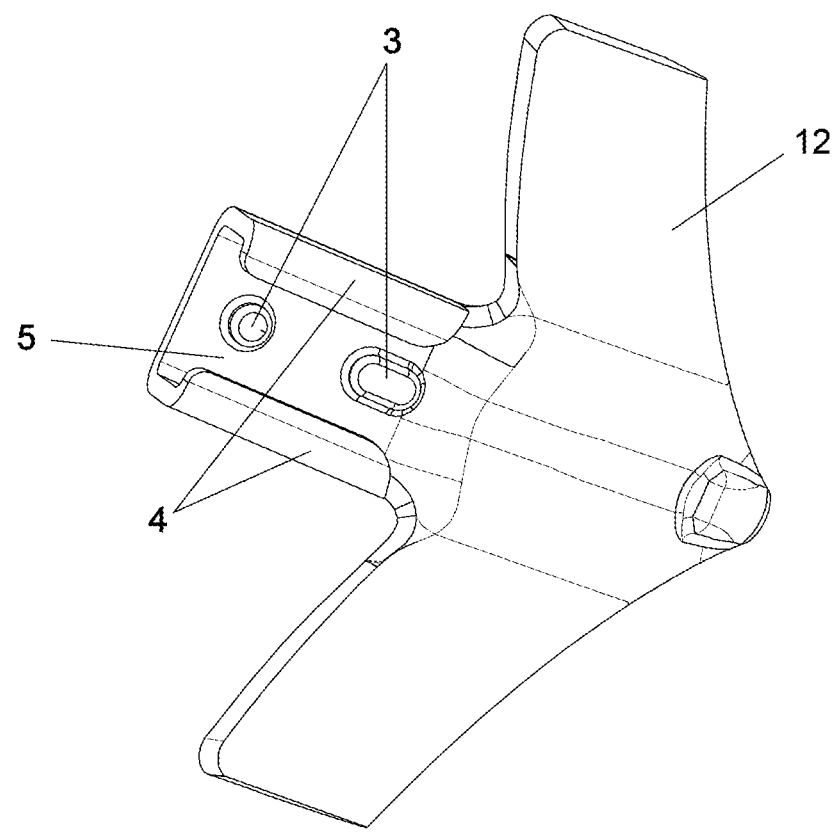
FIG. 2.—Shows a rear view of the sweep of the quick-change system.

The neck (2) has a transverse "C"-shaped profile and comprises an inner surface (5) forming the central part of the "C" and symmetrical side flaps (4) including bent portions. FIG. 2 shows how these bent portions are facing each other inwardly.

FIG. 2 shows how the inner surface (5) of the neck (2) comprises at least one lug (3), preferably two for a greater fastening, wherein said lugs (3) fit in the holes (10) in the cultivator shank (9), thus avoiding transverse and longitudinal movements of the sweep (12) on the cultivator shank (9).

Figure 5A:
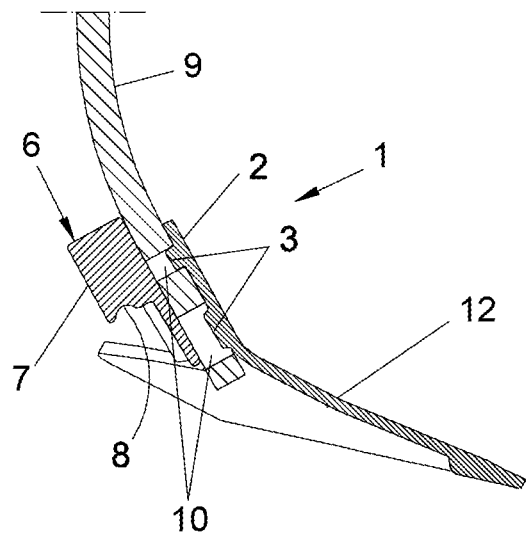
FIG. 5*a*.—Shows a cross-sectional view of the quick-change system. There is a neck with a straight longitudinal section, a cylindrical lug and an oblong lug.
Figure 5B:
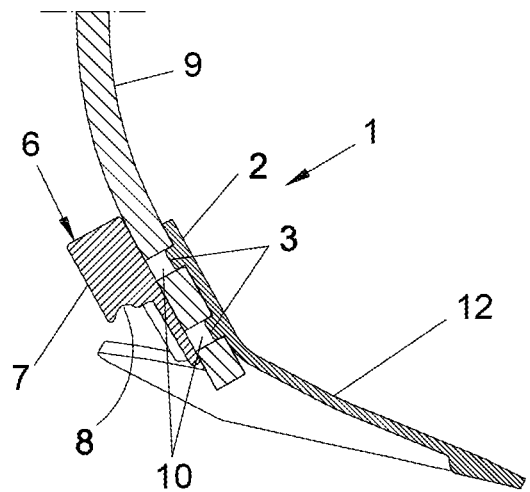
FIG. 5b.—Shows a cross-sectional view of the quick-change system. There is a neck with a straight longitudinal section and two cylindrical lugs.
Figure 5C:
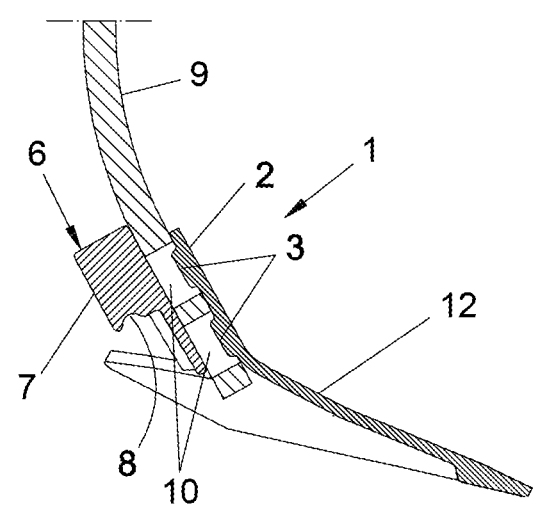
FIG. 5c.—Shows a cross-sectional view of the quick-change system. There is a neck with a straight longitudinal section and two oblong lugs.
Figure 5D:
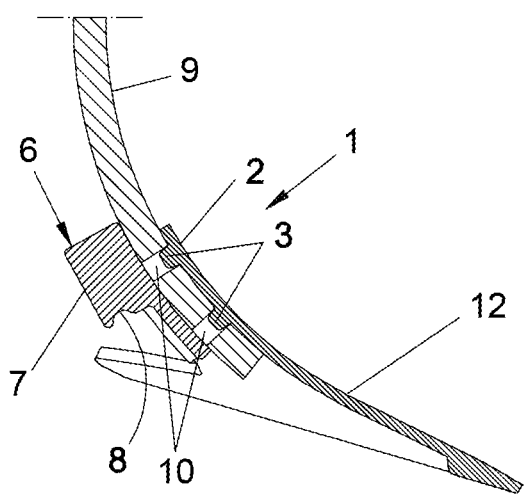
FIG. 5d.—Shows a cross-sectional view of the quick-change system. There is a neck with a curved longitudinal section and two cylindrical lugs.
Figure 6A:
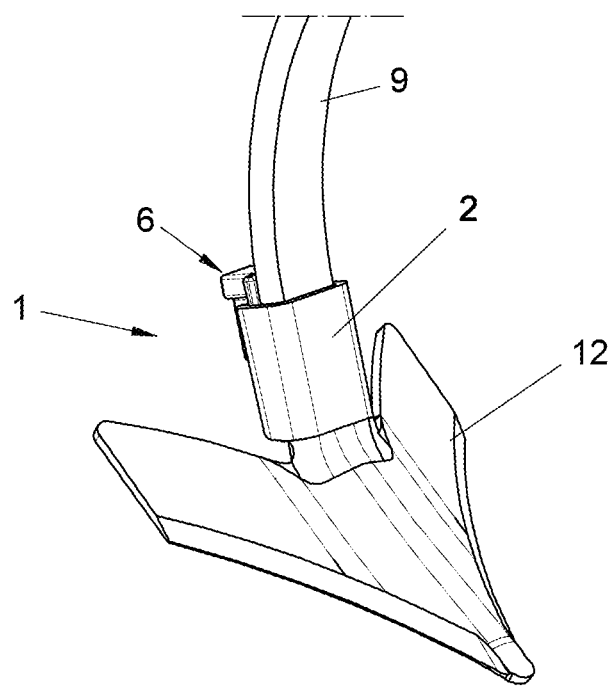
FIG. 6a.—Shows a neck with a straight longitudinal section.
Figure 6B:
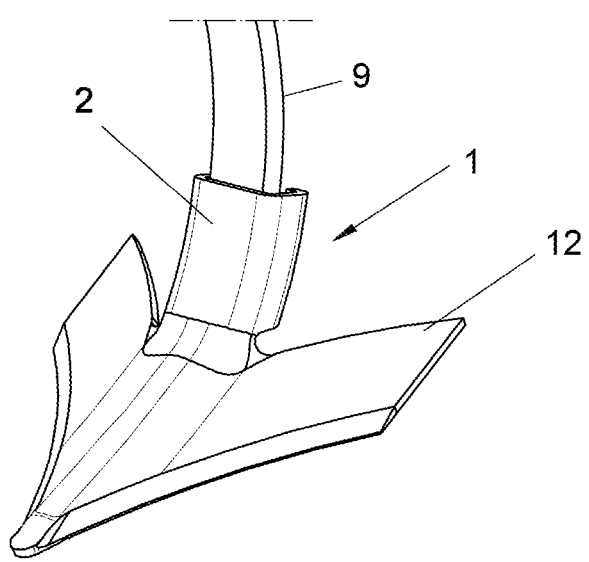
FIG. 6b.—Shows a neck with a curved longitudinal section.
Figure 7:
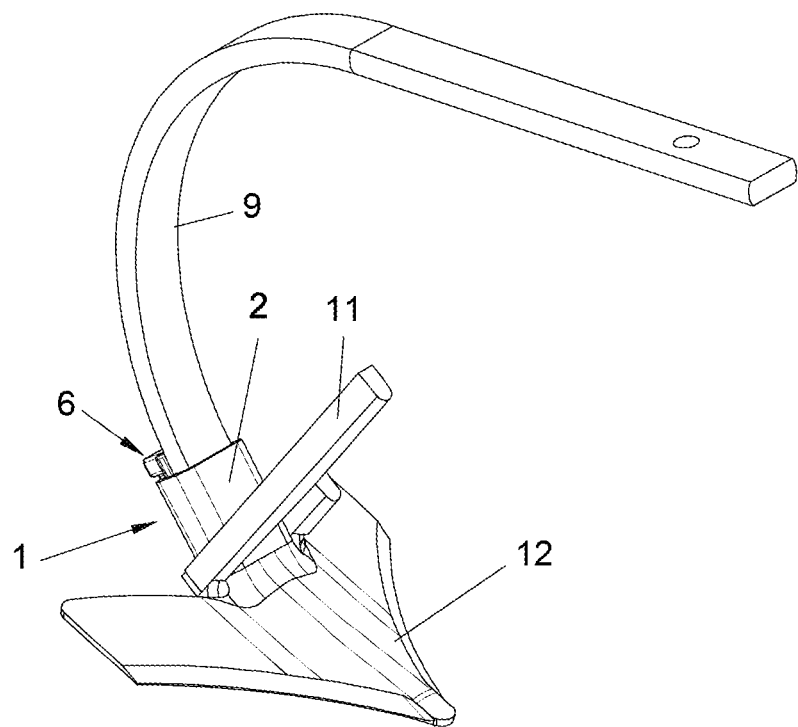
FIG. 7.—Shows the tool that releases the removable wedge.
Figure 8:
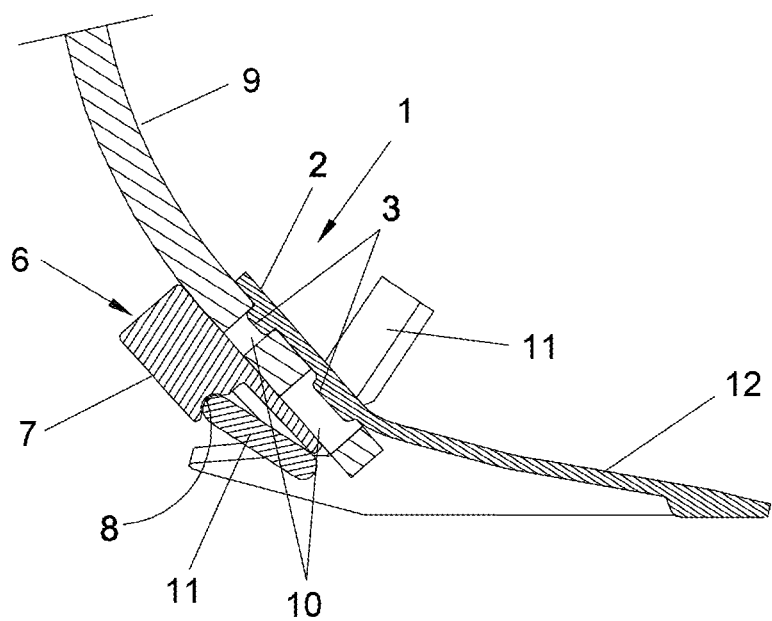
FIG. 8.—Shows a cross-sectional view showing how the tool fits snugly in the slit of the protrusion of the removable wedge, enabling it to be levered against the sweep and thus releasing the removable wedge.

The side flaps (4) clasp the cultivator shank (9) and also serve to guide the sweep (12) through said cultivator shank (9). The longitudinal section of the neck (2) may be straight as shown in FIGS. 5a, 5b, 5c and 6a or may be curved as shown in FIGS. 5d and 6b. This depends on the design of the cultivator shank (9) on which the sweep (12) is to be installed.

The lugs (3) may be cylindrical or oblong (depending on the holes (10) of the cultivator shanks (9) on which the sweep (12) is to be installed) and are responsible for correctly positioning the sweep (12) in the cultivator shank (9). FIGS. 5a, 5b, 5c and 5d show some of the possible lug (3) designs together with different neck designs (2). Any other combination would also be possible.

Figure 3:
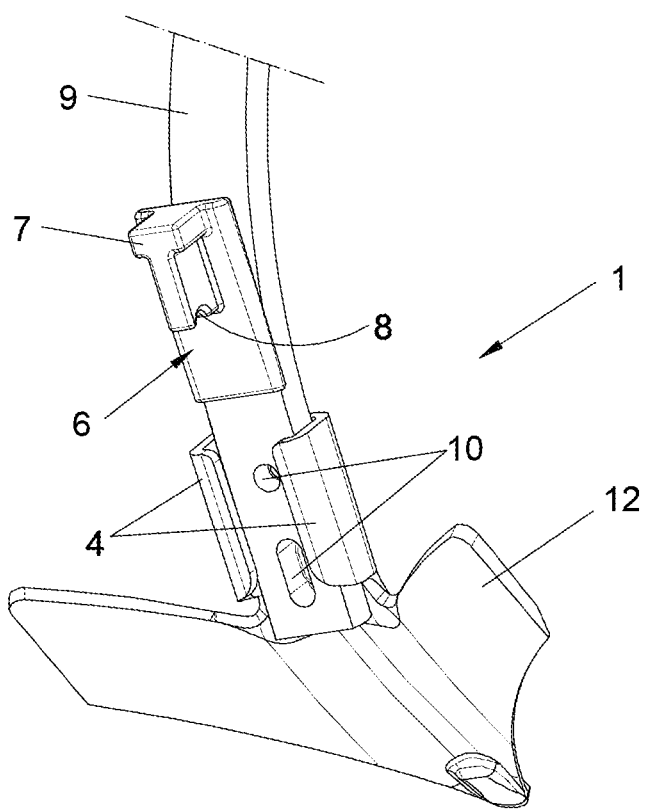
FIG. 3.—Shows a rear view of the quick-change system assembly.
Figure 4:
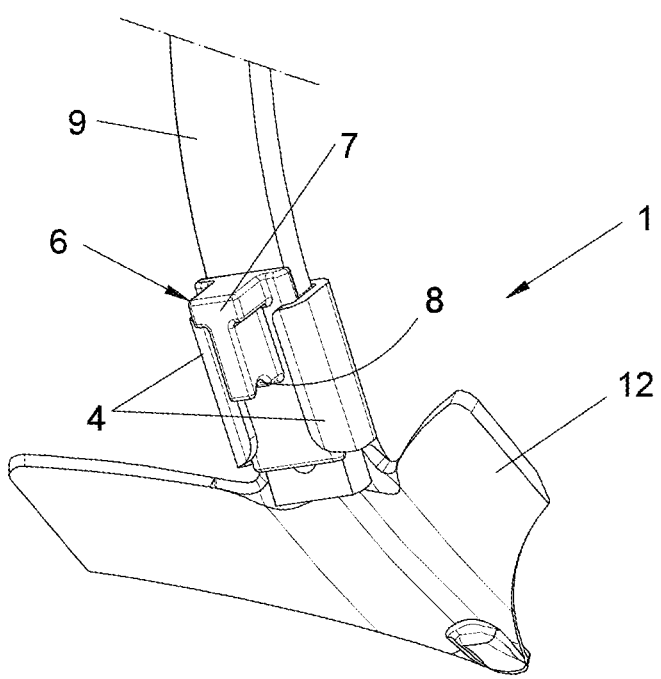
FIG. 4.—Shows a rear view of the quick-change system assembly with the removable wedge inserted in the neck of the sweep.

FIGS. 3 and 4 show that the removable wedge (6) is inserted through the upper part of the neck (2) and makes it possible to retain the sweep (12) against the cultivator shank (9), preventing the lugs (3) from leaving the holes (10) and thus securing the sweep (12) against the cultivator shank (9). FIG. 4 shows how said removable wedge (6) is inserted between the side flaps (4) of the neck (2) and the cultivator shank (9).

Figure 9:
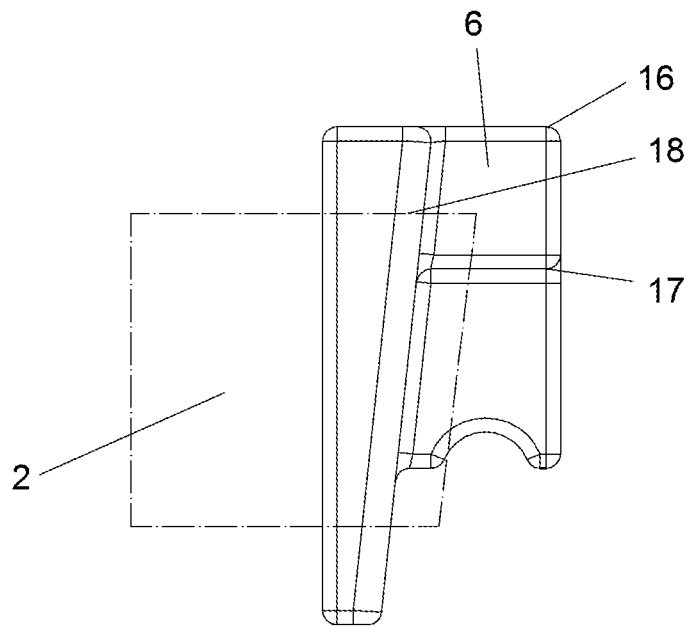
FIG. 9.—Shows the removable wedge having a mounting indicator.

Once the neck (2) is correctly placed on the cultivator shank (9), with the lugs (3) in the holes (10) of the cultivator shank (9), the removable wedge (6) is inserted by means of the use of a hammer until the sweep (12) and cultivator shank (9) assembly is perfectly secured. For this purpose, the FIG. 9 shows that the removable wedge (6) comprises a mounting indicator (16-17) defined between a top mark (16) and a bottom mark (17), both the top and the bottom marks being comprised in the removable wedge (6), such that the removable wedge is correctly placed when the upper part (18) of the neck (2) is placed within the mounting indicator.

The removable wedge (6) comprises in its central part a protrusion (7) which facilitates its gripping and handling and in turn, said protrusion (7) comprises at the bottom a slit (8) in which a tool (11) for releasing the removable wedge (6) is fitted and levers against the sweep (12).

As can be seen in the figures, and more particularly in FIG. 4, the side flaps (4) do not touch each other, such that upon insertion of the removable wedge (6) in the neck (2), the protrusion (7) protrudes and is located between both side flaps (4).

If the cultivator shank (9) where the quick-change system (1) is to be used is curved, both the neck (2) and the removable wedge (6) will have a longitudinal section with a curved shape which adapts to said cultivator shank (9).

The combination of the lugs (3) in the holes (10) and the removable wedge (6) enable the quick-change system (1) to withstand the stresses to which it is to be subjected. With this system (1), greater robustness is provided to the connection between the sweep (12) and the cultivator shank (9), which makes it possible to withstand both longitudinal and transverse stresses (when the agricultural machine is rotating) during tillage.

If a cylindrical and an oblong lug (3) are combined, the cylindrical lug (3) fits snugly in the cylindrical hole (10) of the cultivator shank (9), while the oblong lug (3) fits transversely in the oblong hole (10) of the cultivator shank (9), but does not fit longitudinally in order to absorb the manufacturing tolerances between the centers of the lugs (3) and the holes (10).

If there are two cylindrical lugs (3) or two oblong lugs (3), they can be fitted in two ways: either one lug (3) is given the exact dimensions (adjusted to the dimensions of the hole (10)), which prevents the movements of the sweep (12) in all directions and the other lug (3) is reduced in size to the sum of the tolerances between centers plus the tolerance of the lugs (3), or the same reduction of tolerance is applied to both lugs (3).

Figure 10:
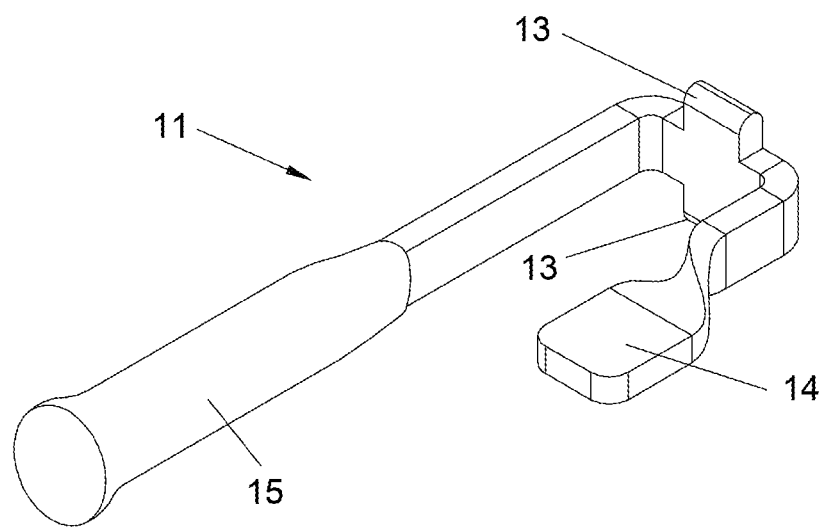
FIG. 10.—Shows the tool that releases the removable wedge alone.

The FIG. 10 shows that the tool (11) has a "U" inverted shape, where in the intermediate part of the inverted "U", the tool comprises two opposite tabs (13). Each tab (13) is configured to fit over the slit of the removable wedge (or its protrusion) and to lever against the sweep. The tool (11) having a grip (15) on one end of the tool and a striking area (14) on the other end of the tool. The grip (15) allows a user to hold on the tool and the striking area (14) allows the tool to be impacted by a hammer (or similar) in order to improve the lever effect against the sweep (12). The "U" inverted shape of the tool along with the opposite tabs allows the tool to have an ambidextrous usage.

The present invention should not be limited to the embodiment described herein, as other embodiments may be carried out by those skilled in the art in view of the present description. Accordingly, the scope of the invention is defined by the following claims.

The invention claimed is:

1. A quick-change system for a sweep comprising:
   a cultivator shank,
   a sweep comprising a neck, the neck being configured for coupling the sweep to the cultivator shank, and
   a removable wedge,
   wherein the neck comprises at least one lug, attached to an inner surface of the neck, to be fitted into at least one hole of the cultivator shank,
   wherein the neck defines a transverse "C"-shaped profile that includes a pair of side flaps which guide the cultivator shank through the neck, and comprise bent portions at each end configured to clasp said removable wedge as it is inserted through an upper part of the neck, and
   wherein the removable wedge is configured to slide between the pair of side flaps along the cultivator shank in a longitudinal direction of the cultivator shank against the inner surface of the neck, as the at least one lug of the sweep is pressed into the cultivator shank and secures the position of the cultivator shank inside the sweep,
   such that the fitting of the at least one lug of the sweep in the at least one hole of the cultivator shank together with the removable wedge inserted in the neck retain and fasten the sweep to the cultivator shank.

2. The quick-change system for a sweep according to claim 1, wherein the removable wedge is wedge-shaped.

3. The quick-change system for a sweep according to claim 1, wherein the removable wedge comprises in a central part a protrusion with a slit, wherein the protrusion is configured to protrude and be located between the side flaps.

4. The quick-change system for a sweep according to claim 1, wherein the inner surface of the neck comprises a total of two lugs configured to fit into respective holes of the cultivator shank.

5. The quick-change system for a sweep according to claim 4, wherein one of the lugs is cylindrical and the other lug is oblong.

6. The quick-change system for a sweep according to claim 4, wherein both lugs are cylindrical.

7. The quick-change system for a sweep according to claim 4, wherein both lugs are oblong.

8. The quick-change system for a sweep according to claim 1, wherein the at least one lug is cylindrical.

9. The quick-change system for a sweep according to claim 1, wherein the at least one lug is oblong.

10. The quick-change system for a sweep according to claim 1, wherein the neck defines a longitudinal section having a straight shape.

11. The quick-change system for a sweep according to claim 10, wherein the removable wedge defines a longitudinal section having a straight shape.

12. The quick-change system for a sweep according to claim 1, wherein the neck defines a longitudinal section having a curved shape.

13. The quick-change system for a sweep according to claim 12, wherein the removable wedge defines a longitudinal section having a curved shape.

14. The quick-change system for a sweep according to claim 1, wherein the side flaps of the neck are symmetrical, facing each other inwardly.

15. The quick-change system for a sweep according to claim 1, wherein the removable wedge further comprises a mounting indicator defined between a top mark and a bottom mark, both the top and the bottom marks being comprised in the removable wedge, such that the removable wedge is correctly placed when an upper part of the neck is placed within the mounting indicator.

16. The quick-change system for a sweep according to claim 1, wherein the system further comprises a tool, which is configured to release the removable wedge from the sweep.

17. The quick-change system for a sweep according to claim 16, wherein the tool comprises an inverted "U" shape, where in an intermediate part of the inverted "U", the tool comprises two opposite tabs, each tab being configured to fit over a slit of the removable wedge and to lever against the sweep; the tool further comprising a grip on one end of the tool and a striking area on the other end of the tool.

* * * * *